Figure 1:
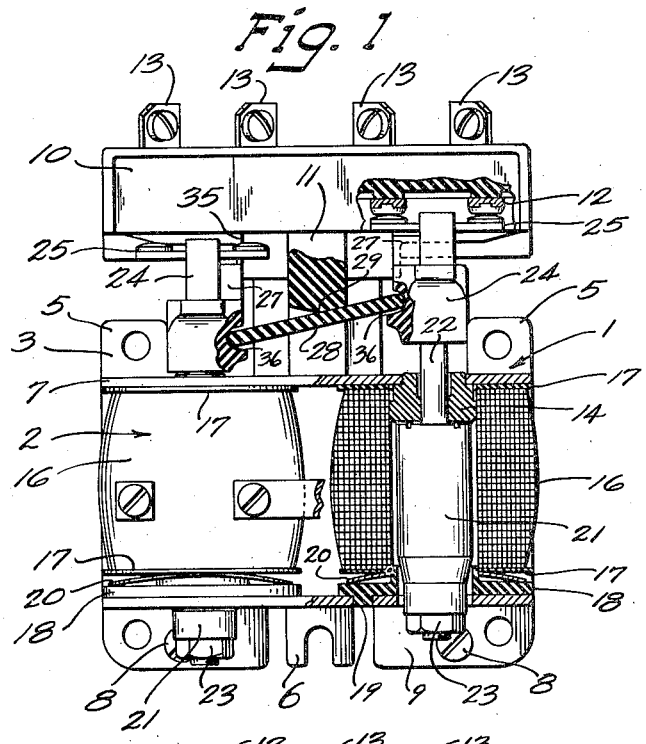

July 2, 1957

L. H. MATTHIAS 2,798,188

SOLID POLE ELECTRO-MAGNETIC ACTUATOR
FOR ALTERNATING CURRENT

Filed March 16, 1953

2 Sheets-Sheet 1

INVENTOR.
Lynn H. Matthias
BY
Arthur H. Seidel
Attorney

July 2, 1957
L. H. MATTHIAS
2,798,188
SOLID POLE ELECTRO-MAGNETIC ACTUATOR
FOR ALTERNATING CURRENT
Filed March 16, 1953
2 Sheets-Sheet 2
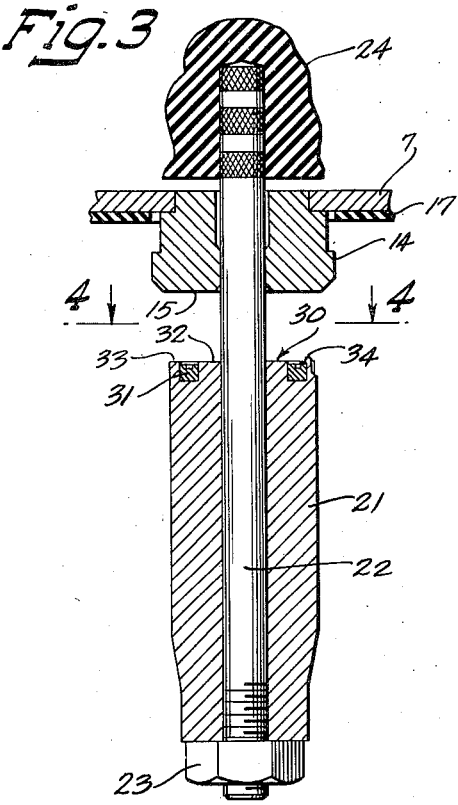
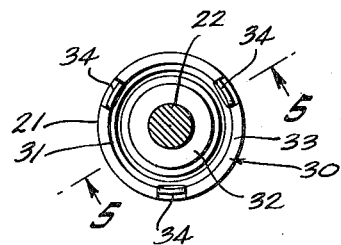
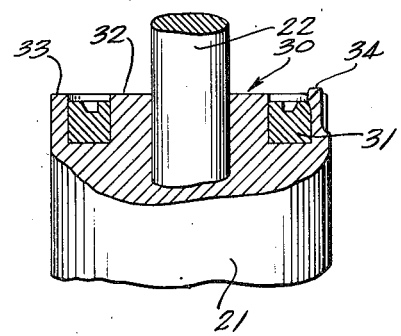
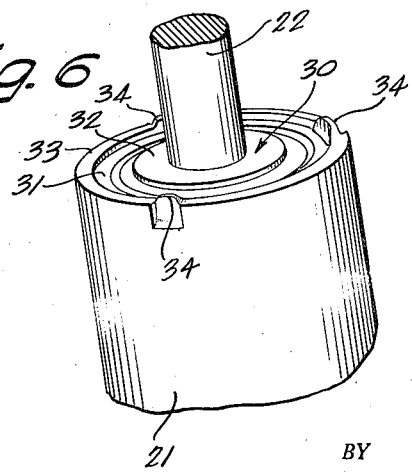
INVENTOR.
Lynn H. Matthias
BY
Arthur H. Seidel
Attorney

:::::::::::::::::::::::::::::::::::::::::::::::::::::::::::::::::::::

United States Patent Office 2,798,188
Patented July 2, 1957

2,798,188

SOLID POLE ELECTRO-MAGNETIC ACTUATOR FOR ALTERNATING CURRENT

Lynn H. Matthias, Fox Point, Wis., assignor to Allen-Bradley Company, Milwaukee, Wis., a corporation of Wisconsin Application March 16, 1953, Serial No. 342,618

2 Claims. (Cl. 317—185)

This invention relates to electro-magnetic actuators and it more specifically resides in an actuator having a field coil with a magnet frame disposed in flux conducting relation to the coil and an armature movable toward and away from open and closed positions with said magnet frame wherein the meeting faces of the armature and magnet frame come into sealing engagement at three separated points only with adjacent pole face areas of substantial extent being separated from one another by a small air gap maintained by three spaced projections rising from the meeting pole faces.

It is desirable that alternating current electro-magnetic actuators be constructed so that the armature will be retained, when moved to closed position without undue vibration induced by the alternating flux. Close conformation of the meeting pole faces through adjustment of the laminations of the magnetic members and properly dimensioned shading coils are means commonly used to minimize unwanted vibration.

In some alternating current actuators, for example, those used for light service and short duty cycles, it is desirable to avoid the expense of using laminations in the armatures and magnet frames but such magnets have heretofore been notably noisy.

It is an object of this invention to provide an electro-magnetic actuator for alternating current with solid armature and magnet frame members that operates at a low noise level upon closure of the armature with the magnet frame.

It is another object of this invention to provide an electro-magnetic actuator for alternating current having solid magnetic members with pole faces for the magnetic members that seal when moved to closed position in a stable manner that is not subject to shift with variations in flux densities.

It is another object of this invention to provide an electro-magnetic actuator with meeting pole faces having a set of three restricted extensions providing a tripodal engagement between the oppositely disposed pole faces.

These and other objects and advantages of this invention will appear in the description to follow. In the description reference is made to the accompanying drawings, which form a part hereof, and in which there is shown by way of illustration and not of limitation one particular form in which this invention may be embodied.

Figure 2:
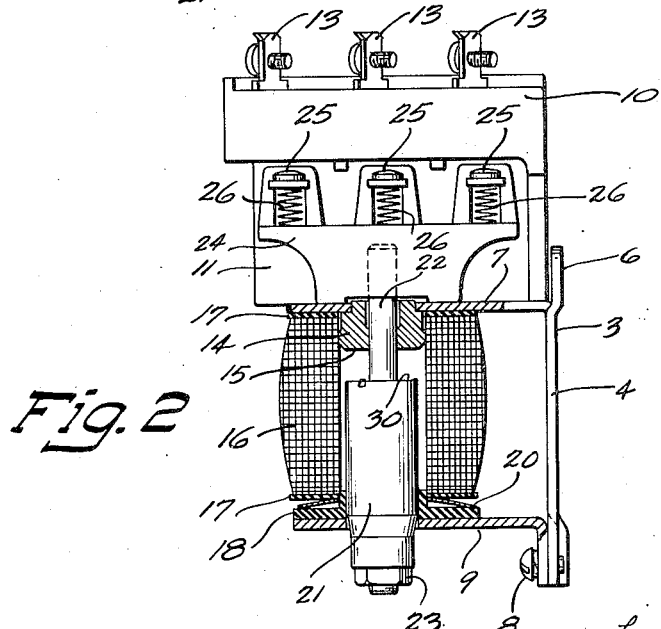

In the drawings:

Fig. 1 is a front view in elevation of an electromagnetic reversing switch with parts broken away and in section in which this invention is embodied, Fig. 2 is a side view in elevation with parts broken away and in section of the reversing switch shown in Fig. 1, Fig. 3 is an enlarged detail view in section of the plunger armature and the fixed pole piece of the magnet frame of the reversing switch shown in Fig. 1, Fig. 4 is a top plan view of the plunger armature of the switch shown in Fig. 1 viewed through the plane 4—4 in Fig. 3, Fig. 5 is a fragmentary side view in elevation of the upper portion of the plunger armature with parts broken away and in section viewed through the plane 5—5 in Fig. 4, and Fig. 6 is a fragmentary view in perspective of the upper portion of the plunger armature.

Referring now to the drawings, there is shown in Fig. 1 a pair of switches 1 and 2 disposed side by side for alternative energization with a source of alternating current. The switches 1 and 2 may be interlocked, by means to be described, to permit closure of but one switch at a time and may be employed as across the line contactors for starting, stopping and reversing alternating current motors.

A frame 3 of magnetic sheet material common to each of the switches 1 and 2 provides the main support for the apparatus. The frame 3 has a vertical magnetic back wall 4 provided with upper and lower mounting brackets 5 and 6 and a horizontal magnetic top plate 7 extending forwardly from the upper margin of the back wall 4. Secured to the lower margin of the back wall 4 by mounting screws 8 is a forwardly extending magnetic bottom plate 9 disposed beneath the top plate 7. A contact hood 10, which is common to switches 1 and 2, is supported by a central partition 11 secured to and rising upwardly from the top plate 7. Mounted in the contact hood 10 on either side of the partition 11 are stationary contacts 12 that extend through the hood 10 and form terminals 13 for convenient connection to electrical conductors.

A pair of fixed pole pieces 14 of solid magnetic material are secured in the top plate 7 and project downwardly toward the bottom plate 9 to present a pair of downwardly facing pole faces 15, one for each switch 1, 2. A pair of coils 16 disposed between the top plate 7 and the bottom plate 9 encircle the stationary pole pieces 14. Protective washers 17 are disposed above and below the ends of each coil 16 and a pair of spacers 18 of molded material, such as a phenol-aldehyde resin having good dry bearing qualities in contact with sliding metal, rest on the bottom plate 9 and enter the lower ends of the central openings of the coils 16. Each spacer 18 has a set of three toes 19 received within complementary openings in the bottom plate 9 which retain the spacers 18 in fixed position and in turn to locate the lower end of each coil 16. An annular spring washer 20 is inserted between each spacer 18 and the fiber washer 17 at the bottom of the associated coil 16 to restrain vertical coil shift.

A plunger armature 21 of solid magnetic material and of generally circular cylindrical form is received in each of the central openings of the coils 16. A plunger rod 22 of non-magnetic material passes through each of the armatures 21 and as shown in Fig. 3 the lower ends of the plunger rods 22 are in threaded engagement with their respective armatures 21. A lock nut 23 is brought up tightly against the bottom of each armature 21 to secure the respective armatures 21 and plunger rods 22 in place. The lower end of each armature 21 passes through a central opening in the associated spacer 18 which furnishes a sliding bearing guide for the armature. An upper bearing is provided for each plunger rod 22 by the central opening in its associated stationary pole piece 14.

Mounted on the upper end of each plunger rod 22 is a movable contact cross bar 24 that rests upon the top plate 7 when the coil 16 of the respective switch 2 is deenergized, thus limiting downward travel of the armature assembly. Each cross bar 24 mounts a plurality of movable bridging contacts 25 disposed in facing relation with stationary contacts 12 in the hood 10. Upward movement of an armature 21 into closed position with its associated pole piece 14 carries the movable contacts 25 into engagement with the aligned stationary contacts 12. A contact spring 26 is disposed beneath each bridging contact 25 to provide contact pressure upon closure with a stationary contact 12. Guide ledges 27 formed as a part of each cross bar 24 slidingly engage complementary channels 35 in the contact hood 10 to prohibit twisting of an armature and its assembly about its axis.

The switches 1 and 2 are mechanically interlocked to preclude simultaneous closure by an interlock bar 28 that extends between and is received within suitable facing notches 36 in the cross bars 24, as shown in Fig. 1. The bar 28 extends beneath a fulcrum-like restricting bridge 29 that is an integral part of the central partition 11. The bridge 29 blocks the bar 28 from moving to a raised horizontal position and allows but one end of the bar 28 to move to raised position at a time, thus precluding simultaneous closure of the switches 1 and 2.

Referring now more specifically to Figs. 3, 4 and 5, the upper end of the armature 21 presents a circular pole face 30 in facing relation to the meeting flat circular pole face 15 of the associated pole piece 14. A circular slot cut in the end of the armature 21, concentric with the pole face receives a short circuited single turn shading coil 31. The coil 31 is ordinarily of copper or other low resistance material. The top of the coil 31 lies slightly beneath the surface of the pole face 30 to divide the pole face 30 into a central area 32 and a concentric outer rim 33.

At three positions about the periphery of the rim 33 protrusions 34 of limited area extend slightly above the plane of the pole face 30. The protrusions 34 may be formed in any convenient manner. In the form of apparatus shown in the drawings they appear in the shape assumed as the result of a staking operation applied to the upper edges of the armature 21 to deform the material thereof inwardly and upwardly to form the protrusions 34. The same staking operation may be utilized also to secure the shading coil 31 in position, as shown.

The three protrusions 34 provide a tripodal engagement between armature 21 and field piece 14, upon energization of the associated coil 16. The armature 21 thus engages the pole piece 14 in such manner that it will remain stationary and will not shift or vibrate with the periodic variations of flux. The magnet will thus function without noisy chatter, hum or vibration and will be characterized by quiet operation typical of magnets with carefully conformed meeting pole faces. The protrusions 34 are spaced about the armature rim 33 to define a triangular area that encompasses a major part of the pole face 30. Even where the magnet is constructed with dimensional errors the mean point of application of the attractive magnetic force having due regard for the lag produced by the shading coil 31 falls within this area throughout each cycle of periodic flux variation and noisy motion of parts is unlikely. If the magnet is carefully made the tripodal engagement of the protrusions 34 has its centroid coincident with or closely aligned with the centroid of attractive force at all intervals of the alternating cycle and quietness of operation is ensured.

It has been found in the practice of this invention, that the amount by which the protrusions 34 extend above the pole surface 30 may be small. For example, for a switch having an armature of configuration like that of the drawings, with a diameter of 9/16 inch and a length of 1 15/32 inches the protrusions will perform a decidedly useful function if they exend one thousandth of an inch above the pole face 30 within a tolerance of five ten thousandths of an inch. Repeated operation of a switch will, of course, produce wear of the protrusions, however, it has been found that quiet operation will continue after repeated use, since such wear will produce highly conformed meeting pole faces before the effects of the protrusions 34 are lost. Thus a magnet constructed in accordance with this invention is quiet at the start and remains so throughout an extended life.

The protrusions 34 may be formed as well, on the pole piece 14, or some may be formed on the pole face 30 and some on the pole piece 14. It is sufficient only that there be provision for tripodal engagement with the major area of the meeting pole faces being, in the main, within the triangular area of the tripodal engagement. If shading is employed it is preferred that centroid of the shaded area fall also within the triangular area of tripodal engagement. As a result the preferred form of the apparatus of this invention takes the form shown in the drawings where the meeting pole faces are circular, the protrusions are evenly distributed around the circular periphery of the pole faces and shading is concentric with the pole faces.

I claim:

1. In an electromagnetic actuator the combination comprising a field coil with a central opening for connection to a source of alternating current; a non-laminar magnetic field frame extending along the outside of said coil which includes a stationary pole piece with a pole face facing upon the central opening of said coil; a non-laminar magnetic armature disposed within the opening of said coil and reciprocably movable toward and away from said stationary pole piece, said armature having a pole face at one end in facing relation to the pole face of said stationary pole piece to provide a single pair of aligned congruent pole faces; a shading coil embedded in one of said pole faces that divides the face into shaded and unshaded areas; and a set of three protrusions disposed between the pole faces each extending from a pole face and adapted to engage the opposite pole face upon movement of the armature toward the stationary pole piece, which protrusions are disposed along the margins of the congruent pole faces to define a triangular area all of which is encompassed within each of the pole faces and which in turn encompasses the centroid of both said shaded and unshaded areas.

2. In an electromagnetic actuator the combination comprising a field coil with a central opening for connection to a source of alternating current; a non-laminar magnetic field frame extending along the outside of said coil which includes a stationary pole piece with a circular pole face facing upon the central opening of said coil; a non-laminar magnetic armature disposed within the opening of said coil and reciprocably movable toward and away from said stationary pole piece, said armature having a circular pole face at one end in facing concentric relation to the pole face of said stationary pole piece; a circular shading coil concentric with said circular pole faces embedded in one of said pole faces that divides the face into shaded and unshaded areas that are each concentric with the pole faces; and a set of three protrusions disposed between the pole faces each extending from a pole face and adapted to engage the opposite pole face upon movement of the armature toward the stationary pole piece, which protrusions are disposed substantially equidistant circumferentially about the periphery of the circular pole faces to define a triangular area having a centroid substantially coincident with the centers of said pole faces and hence said shaded and unshaded areas.

References Cited in the file of this patent

UNITED STATES PATENTS

| | | |
|---|---|---|
| 986,216 | Path | Mar. 7, 1911 |
| 1,576,155 | Stevens | Mar. 9, 1926 |
| 1,582,986 | Harris | May 4, 1926 |
| 2,238,401 | Shaw | Apr. 15, 1941 |